United States Patent [19]
Basco et al.

[11] 3,907,845
[45] Sept. 23, 1975

[54] 3-OXIMINO-17α-PROPADIENYL-SUB-STITUTED-4-GONENES

[75] Inventors: Imre Basco, Morristown, N.J.; Eugene E. Galantay, Liestal, Switzerland

[73] Assignee: Sandoz Inc., East Hanover, N.J.

[22] Filed: Sept. 19, 1973

[21] Appl. No.: 398,584

Related U.S. Application Data

[63] Continuation-in-part of Ser. No. 154,190, June 17, 1971.

[52] U.S. Cl. ......... 260/397.5; 424/238; 260/397.45
[51] Int. Cl.² ........................................ C07J 43/00

[56] References Cited
UNITED STATES PATENTS

| | | | |
|---|---|---|---|
| 3,211,756 | 10/1965 | Mazur | 260/397.1 |
| 3,299,107 | 1/1967 | Mazur | 260/397.5 |
| 3,501,508 | 3/1970 | Shroff | 260/397.5 |
| 3,507,888 | 4/1970 | Klimstra | 260/397.3 |
| 3,532,689 | 10/1970 | Shroff | 260/239.55 |

*Primary Examiner*—Elbert L. Roberts
*Attorney, Agent, or Firm*—Gerald D. Sharkin; Richard E. Vila; Frederick H. Weinfeldt

[57] ABSTRACT

The compounds are 3-oximino-17α-propadienyl-substituted steroids, e.g. 17α-propadienylestra-4-en-17β-ol-3-one oxime and are useful in the regulation of reproduction in warm-blooded animals.

6 Claims, No Drawings

3-OXIMINO-17α-PROPADIENYL-SUBSTITUTED-4-GONENES

This is a continuation-in-part of copending application Ser. No. 154,190 (filed June 17, 1971).

This invention relates to steroidal compounds, and more particularly to 3-oximino-17α-propadienyl-substituted-4-gonenes, and to the preparation of such compounds as well as to therapeutic compositions which contain such compounds and the use of such compounds.

The compounds of this invention, i.e., Compounds I, are conveniently represented by the formula:

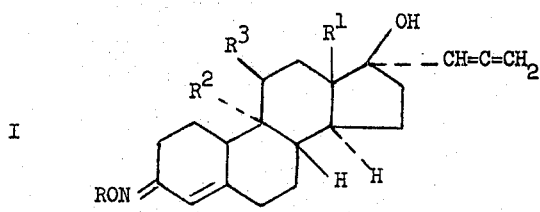

I wherein
R is a hydrogen atom or lower alkanoyl, e.g. having from two to four carbon atoms, such as acetyl, propionyl and butyryl, including isomeric forms where they exist, but are preferably unbranched;
$R^1$ is unbranched alkyl having from one to three carbon atoms, i.e., methyl, ethyl or n-propyl; and
each $R^2$ and $R^3$ is, independently, a hydrogen atom or methyl;
provided that $R^2$ and $R^3$ are not both methyl.

Compounds I include three classes of compounds, i.e. Compounds Ia, Ib and Ic wherein R and $R^1$ are as defined above:

Ia
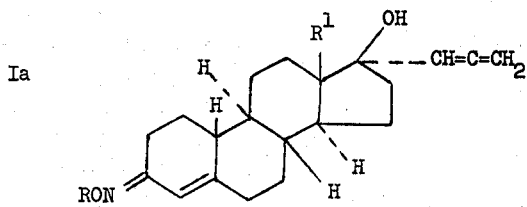

Ib
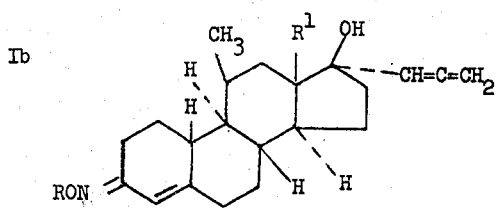

Ic
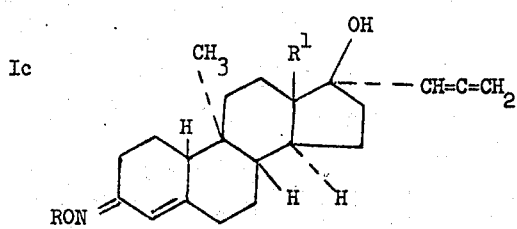

Compounds I are prepared from suitable 3-ketones, i.e., Compounds II;

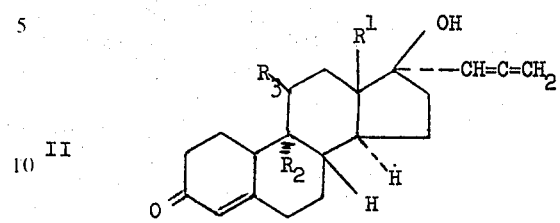

II wherein $R^1$, $R^2$ and $R^3$ and the proviso pertaining thereto are as defined above, by conventional means for preparing an oxime derivative from a 3-keto-steroid (Process a). For example, by treatment of a suitable 3-keto steroid (II) with a suitable hydroxylamine reagent, to yield the oxime, i.e., a Compound I wherein R is a hydrogen atom, and further treatment thereof where a Compound I is desired wherein R is alkanoyl, with an alkanoylating agent (Process b).

There are accordingly three classes of Compound II, i.e., IIa, IIb and IIc corresponding to Compounds Ia, Ib and Ic, respectively, which are described above.

3-Keto steroids suitable as starting materials for the preparation of Compounds I are described in the literature, e.g. in Belgian Pat. Nos. 742,137; 766,147; 767,430 and 767,431, and U.S. Pat. Nos. 3,661,940 and 3,723,483.

A suitable starting material for a Compound Ib may be obtained in the manner described in the U.S. Pat. No. 3,377,366 (issued Apr. 9, 1968) and those compounds not known may be prepared in a manner analogous to that for preparing the known compounds. Said starting material is a 3-methoxy-11β-methylgona-2,5(10)-dien-17-one which by treatment analogous to the series of reaction steps described in the above-mentioned patents yields an 11β-methyl-17α-propadienylgona-4-en-17β-ol-3-one, suitable for use as a Compound IIb.

Compounds of Class Ic may be prepared by employing a 3-lower alkoxy-9α-methylgona-1,3,5(10)-trien-17-one, e.g. 9α-methylestrone methylether, which is described, e.g., in Belgian Pat. No. 753,779, by a series of steps involving subjecting such 17-keto-triene to Birch reduction conditions to obtain the corresponding 2,5(10)-dien-17β-ol which is then treated so as to oxidize the 17-hydroxy function to an oxo function thereby obtaining a 17-keto compound which is then subjected to treatment analogous to the series of process steps described in the above-mentioned Belgian Patents to obtain the 9α-methyl 17α-propadienylgona-4-en-17β-ol-3-one (a Compound IIc), which may then be reacted to form the 3-oxime derivative thereof (i.e., a Compound Ic).

A convenient method for carrying out Process (a) to obtain a Compound I wherein R is a hydrogen atom, involves treating a Compound II, under anhydrous conditions, with a hydroxylamine reagent, preferably hydroxylamine acetate in an inert organic solvent, e.g. a lower alkanol, such as methanol or ethanol, at moderate temperatures, e.g. conveniently at room temperature, or at other temperatures preferably lower than the reflux temperature of the solvent. The hydroxylamine reagent may be prepared separately or in situ, e.g. from a hydroxylamine salt, e.g. the hydrochloride, and a base such as sodium acetate, sodium hydroxide or pyridine. Where pyridine is employed as base, it may serve in excess as solvent for the reaction.

A convenient method of carrying out Process (b) to obtain a Compound I wherein R is lower alkanoyl, involves treating a Compound I wherein R is a hydrogen atom, with an alkanoylating agent. It is preferred that in Process (b) alkanoylating agents which are not strongly acidic be employed, as the 17α-propadienyl-substituent may be adversely affected by such conditions. A lower aliphatic acid or acid anhydride may be used as the alkanoylating agent in the presence of an acid binding agent, e.g. acetic acid anhydride with pyridine. The alkanoylation reaction may be carried in an inert organic solvent, e.g. benzene, at moderate temperatures, e.g. −10° to 50°C., preferably at room temperature. Where the alkanoylating agent is suitable as a solvent, it may be used in excess to serve as solvent.

The Compounds I prepared as described above may be recovered and refined by means conventional in the art, e.g. by recrystallization or column or layer chromatography.

The compounds of formula (I) are useful because they possess pharmacological properties in animls. In particular, such compounds exhibit a combination of progestational and estrogenic activity and are therefore useful in the control of fertility in female warm-blooded animals and regulations of estrus or the menstrual function thereof, and in addition are also useful as luteolytic agents in the prevention or interruption of pregnancy in such animals. The progestational activity is indicated by the well-known Clauberg test; the method basically described in Endrocrinology 63 (1958) 464 wherein a rabbit is given 0.001 to 1.0 milligrams of active agent. The estrogenic activity is indicated by observing increase in white mouse uterine weight, e.g. as described in Endocrinology 65, 265 (1959) or by observing for cornification of vaginal epithelium of adult female ovariecomized white rats scored according to the method of Biggers and Claringbold, when said animals are given from 0.001 to 10 milligrams of active agent. Luteolytic activity is indicated by selecting female estrous white rats from a colony, treating them for 4 days and then caging them with fertile males; beginning on the following day, the females are treated for an additional 10 days with the compound being tested; and on the third day following the last treatment the females are sacrificed and the uteri checked for implantation sites (the absence or regression of which being taken as a positive result). Luteolytic activity may also be indicated by a rabbit pseudopregnancy test in which adult New Zealand White female rabbits are injected intravenously with 100 international units of Human Chorionic Gonadotrophin (HCG) to induce ovulation and formation of corpora lutea (pseudopregnancy). The day of treatment with HCG is considered day-1 of pseudopregnancy. Immediately prior to the HCG treatment a 2 ml. blood sample (via heart puncture) is collected. Two ml. blood samples are obtained on various days thereafter through day-12 of pseudopregnancy. On day-3 of pseudopregnancy groups of females are treated orally or injected subcutaneously with corn oil (controls) or various compounds in corn oil. Treatments are continued through day-8 of pseudopregnancy. Blood samples are analyzed for progestin content according to the method of Johansson et al. (Endocrinology Vol. 82, 143-148, 1968). A compound is judged to be luteolytic if plasma progestin levels have returned to pretreatment levels by day-12 of pseudopregnancy.

These compounds may be combined with a pharmaceutically acceptable carrier or adjuvant in a manner which is conventional in the pharmaceutical art. They may be administered orally or parenterally. The dosage will vary depending upon the mode of administration utilized and the particular compound employed. However, in general, satisfactory results are obtained in female warm-blooded animals, e.g. mammals, when the compounds are administered at a daily dosage of from about 0.005 mg. to 30 mg., e.g. about 0.015 mg. to 10 mg. to control fertility or regulate estrus or the menstrual function; and for the prevention or interruption of pregnancy by luteolytic activity at a daily dosage of from about 1 mg. to 100 mg., e.g. from about 1 mg. to 20 mg., daily for from about 1 to 6 days during the luteal phase. Convenient dosage forms suitable for internal administration comprise from about 0.005 mg. to 100 mg., e.g. from about 0.015 to 20 mg. of the compound in admixture with a solid or liquid pharmaceutical carrier or diluent.

A representative formulation suitable for oral administration is a capsule (250 mg.) prepared by standard techniques which contains the following:

| Ingredient | Weight (mg.) |
|---|---|
| 17α-propadienylestra-4-en-17β-ol-3-one oxime | 5 |
| Inert solid diluent (starch, lactose, kaolin) | 245 |

In the following examples illustrating the invention, all temperatures are C. and room temperature is 20° to 30°C., unless indicated otherwise.

EXAMPLE 1

17α-Propadienylestra-4-en-17β-ol-3-one oxime

A solution of 5.0 g. of 17α-propadienylestra-4-en-17β-ol-3-one in 42 ml. of absolute ethanol is mixed with a solution of hydroxylamine acetate (prepared from 3.32 g. of hydroxylamine hydrochloride and 11.3 g. of sodium acetate trihydrate in 42 ml. of absolute ethanol, the resulting solids being filtered off). The resulting mixture is kept at room temperature for one-half hour. The reaction mixture is then diluted with water and the solids which have separated are collected by filtration to give the title product, 17α-propadienylestra-4-en-17β-ol-3-one oxime, m.p. 101° to 164°C.

EXAMPLE 2

13-Ethyl-17α-propadienylgona-4-en-17β-ol-3-one oxime

Repeating the procedure described in Example 1 but replacing the 17α-propadienylestra-4-en-17β-ol-3-one used therein with an equivalent amount of 13-ethyl-17α-propadienylgona-4-en-17β-ol-3-one there is obtained 13-ethyl-17α-propadienylgona-4-en-17β-ol-3-one oxime.

EXAMPLE 3

11β-Methyl-17α-propadienylestra-4-en-17β-ol-3-one oxime

Step A: 3-Methoxy-11β-methyl-17α-N,N-dimethylaminopropynlestra-2,5(10)-dien-17β-ol A total of 1.8 g of lithium is added in small portions to 120 ml of ethylenediamine with stirring at a temperature of 50° – 60° under nitrogen. After addition is complete, the blue solution is heated at 75° – 85° for 1½ hours whereat a pale yellow reaction mixture is obtained. This mixture is then cooled to 10°, and 20 g of N,N-dimethylamino-2-propyne is added dropwise over 5 minute. Stirring is continued at room temperature for 1 hour, at which point a solution of 2.6 g of 3-methoxy-11β-methylestra-2,5(10)-dien-17-one in 40 ml of tetrahydrofuran is added. The mixture is now stirred at room temperature for 4 hours; and after cooling in an ice-water mixture, 100 ml of brine are added under nitrogen followed by 250 ml of ether. The two layers are separated, and the aqueous layer is extracted three times with benzene. The combined organic phases are washed with brine and dried over sodium sulfate. After removal of the solvents, the residue is crystallized from ether to yield 3-methoxy-11β-methyl-17α-N,N-dimethylaminopropynylestra-2,5(10)-dien-17β-ol (m.p. 170° – 175°).

Step B: 3-Methoxy-11β-methyl-17α-N,N-dimethylaminopropynylestra-2,5(10)-dien-17β-ol methiodide To a solution of 2.5 g of 3-methoxy-11β-methyl-17α-N,N-dimethylaminopropynylestra-2,5(10)-dien-17β-ol in 60 ml of acetone is added 15 ml of methyl iodide. The solution is kept at a temperature of 5° for 18 hours during which time a crystalline precipitate forms. This is filtered off and recrystallized from acetone to yield 3-methoxy-11β-methyl-17α-N,N-dimethylaminopropynylestra-2,5(10)-dien-17β-ol methiodide, m.p. 255° – 260° (decomposition).

Step C: 3-Methoxy-11β-methyl-17α-propadienylestra-2,5(10)-dien-17β-ol

To a suspension of 3.1 g of the iodide salt from Step B in 100 ml of anhydrous tetrahydrofuran, under ice cooling, is added 3 ml of a 70% solution of sodium di(methoxyethoxy) aluminum hydride [NaAlH$_2$(OCH$_2$CH$_2$OCH$_3$)$_2$] in benzene, diluted with 10 ml of tetrahydrofuran. The reaction mixture is allowed to warm to room temperature and stirred for a total of 2 hours at which time solution is complete. Water is then added to decompose the excess hydride and the tetrahydrofuran is removed under reduced pressure. The aqueous residue is extracted with methylene chloride and the organic phase is dried over sodium sulfate. After removal of the solvent, the residue is crystallized from ether/hexane (1:2) to yield 3-methoxy-11β-methyl-17α-propadienylestra-2,5(10)-dien-17β-ol, m.p. 135°.

Step D: 11β-Methyl-17α-propadienylestra-4-en-17β-ol-3-one

To a solution of 800 mg of 3-methoxy-11β-methyl-17α-propadienylestra-2,5(10)-dien-17β-ol in 10 ml of methanol is added 5 drops of concentrated hydrochloric acid and the mixture is left at room temperature for 1½ hours. The mixture is then diluted with ice/water and a saturated aqueous solution of sodium bicarbonate is cautiously added until the mixture is no longer acidic. The solution is then extracted with ether, and the organic phase after separation is dried over sodium sulfate. Evaporation of the solvent yields a residue which is crystallized from ether/hexane, (1:2) to give 11β-methyl-17α-propadienylestra-4-en-17β-ol-3-one, m.p. 137° – 139°C.

Step E: 11β-Methyl-17α-propadienylestra-4-en-17β-ol-3-one oxime

Repeating the procedure of Example 1, but replacing the 17α-propadienylestra-4-en-17β-ol 3-one used therein with an equivalent amount of 11β-methyl-17α-propadienylestra-4-en-17β-3-one, there is obtained 11-β-methyl-17α-propadienylestra-4-en 17β-ol-3-one oxime.

EXAMPLE 4

N-Acetoxy-17α-propadienylestra-4-en-17β-ol-3-one oxime

A solution of 3.0 g. of 17α-propadienylestra-4-en-17β-ol-3-one oxime (obtained in Example 1) in 30.0 ml of pyridine is treated with 10.0 ml of acetic anhydride and kept at room temperature for 1 hr. The solution is then diluted with ice water and the separated solids are collected by filtration to give N-acetoxy-17α-propadienylestra-4-en-17β-ol-3-one oxime.

Repeating the procedure of this example, but using an equivalent amount of 11β-methyl-17α-propadienylestra-4-en-17β-ol-3-one oxime (Example 3) in place of the 17α-propadienylestra-4-en-17β-ol-3-one oxime, there is similarly obtained N-acetoxy-11β-methyl-17α-propadienylestra-4-en-17β-ol-3-one oxime.

EXAMPLE 5

9α-Methyl-17α-propadienylestra-4-en-17β-ol-3-one oxime

Step A: 9α-Methyl-estra-2,5(10)-dien-3,17β-diol 3-methyl ether

A solution of 6.0 g. of 9α-methylestrone methyl ether in 90 ml of tetrahydrofuran and 90 ml of 1-butanol is added to 200 ml of ammonia under reflux. A total of 2.8 g. of lithium is then added in portions over 10 min and the resulting blue solution is stirred under reflux for 6 hrs. The ammonia is allowed to evaporate overnight and 50 ml of methanol is added to the residue followed by 300 ml of saturated aqueous sodium chloride and 200 ml of benzene. The two phases are separated and the organic layer is washed with saturated aqueous sodium chloride and 200 ml of benzene. The two phases are separated and the organic layer is washed with saturated aqueous sodium chloride, dried over anhydrous sodium sulphate and evaporated to give a residue which is crystallized from methanol. Thus is obtained 9α-methylestra-2,5(10)-dien-3,17-diol 3-methyl ether m.p. 116° – 120°.

Step B: 3-Methoxy-9α-methylestra-2,5(10)-dien-17-one

A mixture of 5.0 g of 9α-methylestra-2,5(10)-dien-3,17-diol 3 methyl ether and 4.5 g of aluminum isopropoxide in 45 ml of benzene and 45 ml of 2-butanone is stirred and refluxed for 22 hrs., using a water separator. After cooling, the reaction mixture is added to 100 ml. of 2N sodium hydroxide solution and a further 50 ml. of benzene are added. The organic layer is separated, washed with water and saturated sodium chloride and dried over anhydrous sodium sulphate. Removal of the solvent gives a residue which is crystallized from ether/hexane, 1/1 yielding 3-methoxy-9α-methylestra-2,5(10)-dien-17-one, m.p. 155°–158°.

Step C: 17α-N,N-Dimethylanino-propynyl-9α-methylestra-2,5(10)-dien-3,17β-diol 3-methyl ether A total of 2.2 g. of lithium is added portionwise to 150 ml. of ethylenediamine, stirred and maintained at a temperature of 50°–60° under nitrogen. After the addition is complete the blue solution is heated to 75°–85° for 1½ hrs. when a pale yellow reaction mixture is obtained. This is then cooled to 10° and 24 g of N,N-dimethylamino-2-propyne is added over 5 min. Stirring is continued at room temperature for 1 hr., when a solution of 3.2 g. of 3-methoxy-9α-methylestra-2,5(10)-dien-17-one in 40 ml of tetrahydrofuran is added. The mixture is now stirred at room temperature for 16 hrs. After cooling (ice/water) 200 ml. of saturated sodium chloride are added under nitrogen, followed by 300 ml of benzene. The two layers are separated, the aqueous layer extracted three times with benzene and the combined organic phases are washed with saturated sodium chloride before being dried over anhydrous sodium sulphate. After removal of the solvent there is obtained 17α-N,N-Dimethylanino-propynyl-9α-methylestra-2,5(10)-dien-3, 17β-diol 3-methyl ether as an oil which is used in the subsequent step.

Step D: The Quaternary Ammonium Salt

To a solution of 3.8 g. of 17α-N,N-dimethylaminopropynyl-9α-methyl estra-2,5(10)-dien-3,17β-diol 3-methyl ether in 90 ml of acetone is added 30 ml of methyl iodide. The solution is kept at a temperature of 5° for 18 hrs. during which time a crystalline precipitate forms. This is filtered off and recrystallized from methanol/acetone, 1/5, to yield the quaternary salt product m.p. 240°–243° (dec.).

Step E: 9α-Methyl-17α-propadienylestra-2,5(10)-dien-3, 17β-diol 3-methyl ether

To a suspension of 3.3 g. of the above iodide salt in 100 ml of anhydrous tetrahydrofuran, under ice cooling is added 10 ml of a 70% solution of sodium di(methoxyethoxy) aluminum hydride in benzene diluted with 25 ml of tetrahydrofuran. The reaction mixture is allowed to warm to room temperature and stirred for a total of 2 hrs. by which time solution is complete. Water is then added to decompose the excess hydride and the tetrahydrofuran is removed under reduced pressure. The aqueous residue is extracted with methylene chloride and the organic phase is dried over anhydrous sodium sulphate. After removal of the solvent there is obtained the product, 9α-methyl-17α-propadienylestra-2,5 (10)-dien-3,17β-diol 3 methyl ether as an oil sufficiently pure for use in the next step.

Step F: 9α-Methyl-17α-propadienylestra-4-en-17β-ol 3-one

To a solution of 600 mg of 9α-methyl-17α-propadienylestra-2,5(10)-dien-3,17β-diol 3-methyl ether in 10 ml of methanol is added 5 drops of conc. hydrochloric acid and the mixture is left at room temperature for 1½ hrs. It is then diluted with ice/water and a saturated aqueous solution of sodium bicarbonate is slowly added until the mixture is no longer acidic. It is then extracted with ether and the organic solution is dried over anhydrous sodium sulphate. Removal of the solvent gives a residue which is crystallized from ether to yield 9α-methyl-17α-propadienylestra-4-en-17β-ol 3-one.

Step G: 9α-Methyl-17α-propadienylestra-4-en-17β-ol-3-one oxime

Repeating the procedure of Example 1, but replacing the 17α-propadienylestra-4-en-17β-ol-3-one use therein with an equivalent amount of 9α-methyl-17α-propadienylestra-4-en-17β-ol-3-one, there is obtained 9α-methyl-17α-propadienylestra-4-en-17β-ol-3-one oxime.

EXAMPLE 6

Tablets and Capsules Suitable for Oral Administration

Tablets and capsules containing the ingredients indicated below may be prepared by conventional techniques and are useful in the control of fertility in mammals:

| Ingredient | Weight (mg) Tablet | Capsule |
|---|---|---|
| 17α-Propadienylestra-4-en-17β-ol-3-one oxime | 0.5 | 0.5 |
| tragacanth | 10 | — |
| lactose | 247 | 299.5 |
| corn starch | 25 | |
| talcum | 15 | |
| magnesium stearate | 2.5 | |
| Total | 300 mg | 300 mg |

EXAMPLES 7 and 8

Sterile Suspension for Injection and Oral Liquid Suspension

The following pharmaceutical compositions are formulated with the indicated amount of active agent using conventional tachniques. The injectable suspension and the oral liquid suspension represent formulations useful as unit doses and may be administered in the control of fertility in mammals. The injectable suspension and oral liquid suspension are suitably administered once a day for this purpose.

| Ingredients | Weight (mg) Sterile Injectable Suspension | Oral Liquid Suspension |
|---|---|---|
| 17α-Propadienylestra-4-en-17β-ol-3-one oxime | 0.2 | 0.5 |
| Sodium carboxy methyl cellulose U.S.P. | 1.25 | 12.5 |
| Methyl cellulose | 0.4 | — |

| Ingredients | Weight (mg) Sterile Injectable Suspension | Oral Liquid Suspension |
|---|---|---|
| Polyvinylpyrrolidone | 5 | — |
| Lecithin | 3 | — |
| Benzyl alcohol | 0.01 | — |
| Magnesium aluminum silicate | — | 47.5 |
| Flavor | — | q.s. |
| Color | — | q.s. |
| Methyl paraben, U.S.P. | — | 4.5 |
| Propyl paraben, U.S.P. | — | 1.0 |
| Polysorbate 80 (e.g. Tween 80) U.S.P. | — | 5 |
| Sorbitol solution, 70%, U.S.P. | — | 2,500 |
| Buffer agent to adjust pH for desired stability | q.s.* | q.s. |
| Water | for injection, q.s. to 1 ml. | q.s. to 5ml |

*q.s. = quantity sufficient.

What is claimed is:
1. A compound of the formula:

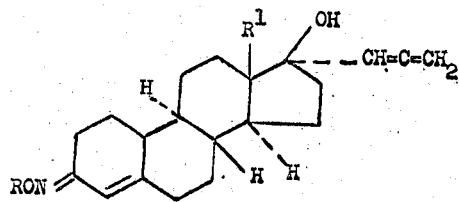

wherein
R is a hydrogen atom or alkanoyl having from two to four carbon atoms; and
$R^1$ is an unbranched alkyl having from one to three carbon atoms.

2. The compound of claim 1 which is 17α-propadienylestra-4-en-17β-ol-one oxime.
3. The compound of claim 1 which is N-acetoxy-17α-propadienyl-estra-4-en-17β-ol-3-one oxime.
4. A compound of claim 1 in which $R^1$ is methyl.
5. A compound of claim 1 in which R is a hydrogen atom.
6. A compound of claim 1 in which R is alkanoyl having from two to four carbon atoms.

* * * * *